United States Patent [19]

Taga et al.

[11] Patent Number: 5,439,259
[45] Date of Patent: Aug. 8, 1995

[54] COUPLING AND METHOD FOR FOLDING BACK A PIPE AND USING FOR IT AND ITS APPARATUS

[75] Inventors: Jun Taga, No. 1-10, Minamiikuta 7-Chome, Tama-Ku, Kawasaki-Shi, Kanagawa-Ken, 214; Kimio Okamoto, Saitama, both of Japan

[73] Assignee: Jun Taga, Kanagawa, Japan

[21] Appl. No.: 104,820

[22] Filed: Aug. 10, 1993

[51] Int. Cl.⁶ ............................. F16L 25/00; F16L 35/00
[52] U.S. Cl. ................................... 285/334.5; 285/386
[58] Field of Search .............. 285/334.5, 354, 386, 285/389, 353, 384

[56] References Cited

U.S. PATENT DOCUMENTS

| | | | |
|---|---|---|---|
| 1,058,542 | 4/1913 | Brown | 285/334.5 X |
| 4,072,328 | 2/1978 | Elliot | 285/354 X |
| 4,127,021 | 11/1978 | Johnson | 72/313 |
| 4,133,565 | 1/1979 | Shutt | 285/334.5 |
| 4,538,842 | 9/1985 | Kowal et al. | 285/354 |

FOREIGN PATENT DOCUMENTS

| | | | |
|---|---|---|---|
| 627199 | 9/1961 | Canada | 285/334.5 |
| 2385969 | 12/1978 | France | 285/334.5 |
| 59-122080 | 8/1984 | Japan . | |
| 443040 | 2/1936 | United Kingdom | 285/334.5 |

*Primary Examiner*—Dave W. Arola
*Assistant Examiner*—Heather Chun Shackelford
*Attorney, Agent, or Firm*—Cummings & Lockwood

[57] ABSTRACT

The invention related to this application is: a method for folding back an opening end of resin pipe comprising following processes, (a) a process for mounting an annular body to a circumference of a pipe, (b) a process for inserting a conically protruded portion of a guiding portion including the conically protruded portion and a curved surface groove formed around this circumference to an opening end of the pipe and simultaneously advancing with rotating the guiding portion, and (c) a process for continuing the advancement with rotating the guiding portion whereby folding back the opening end of the pipe, and inserting the folded back pipe opening end to the circumference of the annular body; and an apparatus for folding back an opening end of resin pipe comprising a clamping element for holding the pipe and a bending element and the clamping element including a tightening mechanism for pushing the pipe to radial direction, and the bending element including a guiding portion for advancing by rotating with abutting to the pipe opening end, a rotational driving mechanism for rotating the guiding portion, and a reciprocating mechanism for advancing/retreating the guiding portion toward the pipe axis direction, so as to make the pipe opening end to be outwardly expanded and simultaneously folded back to axial direction.

2 Claims, 12 Drawing Sheets

COUPLING AND METHOD FOR FOLDING BACK A PIPE AND USING FOR IT AND ITS APPARATUS

BACKGROUND OF THE INVENTION

The present invention relates to a coupling made of synthetic resin used for piping system transferring poisonous fluid of high temperature and high pressure in a field of so-called high technology such as mainly semiconductor production, and method for manufacturing a pipe used for this coupling and its manufacturing apparatus.

As a coupling's mechanism of plastic pipe, various tight sealing structures using of a tight sealing taper screw and ferule and others are known.

However, for instance, in fluoric resins such as TFE(-polytetrafluoroethylene), PFA(copolymer of polytetrafluoroethylene and perfluoroalkylvinylether), FEP(-copolymer of polytetrafluoropropylene) and the like, in accordance with their characteristics, poisonous materials and the like of high temperature and high pressure are many in fluid used for that, and a leakage of fluid are produced which occurs by causes of repeating of expansion and contraction due to heat cycle and generation of creeping and the like.

This is because mainly fine gaps are produced causing from above factors to a joining portion, and a prevention for this is very difficult. Therefore, in conventional couplings and in those kinds, a using in condition at below about temperature of 120 degrees in Centigrade and pressure of 2 Kg/c of fluid is inevitably done.

In accordance with the coupling of the present invention, front end portion of resin pipe folded back and formed in U-shape is coupled to an inner annular portion of tightening means, a folded portion of the resin pipe- positioned at concave portion of inner annular portion, its U-shaped bottom is closely contacted and fixed by an end edge of the inner annular portion and a curved groove of stopper portion according to the screw-coupling of the tightening means and a coupling's main body, and a protruded strip band strengthens a close contact of coupling's main body inner surface and a concave outer circumferential surface of resin pipe folded back portion and at the same time, a lip seal makes a close contacting degree of inner surface of tile coupling main body and an inner circumferential surface of the inner annular portion to be firm and secure, so that a coupling for a pipe of resin of very high in reliability especially fluorine resin can be realized without producing any problem of leakage and the like even in allowable limit range further above the temperature condition and pressure condition of fluid in conventional coupling.

And yet, one which may be cited as a requisite condition for above described coupling is a structure which folded back a pipe opening end to outer side. However, to make a front end of fluorine resin pipe and the like to be simply, exactly and rapidly folded back with meeting to joining condition is very difficult.

Heretofore., although it might have been thought that to fold back a front end of resin pipe toward outside at normal temperature and the like was impossible, a technique for folding back an end portion of resin pipe was almost nothing.

Therefore, an inventor of this application has researched and developed a method for folding back an end of opening of resin pipe and apparatus used for this folding back method comprising a process for making an annular body to outer circumference of a pipe having a core material at inner hollow in compliance with requirement, and a process for continuing to press the pipe opening end to axial direction of the pipe with expanding to outward, and with outwardly expanding the front end by skillfully utilizing a characteristic, particularly elasticity of the resin and simultaneously folding back the pipe opening end naturally at certain time point, and inserting the pipe opening end folded back to outer circumference of aforesaid annular body, in a process of peripheral technique development of aforementioned joining structure.

SUMMARY OF THE INVENTION

The coupling in accordance with the present invention comprises a nut shaped tightening means having an outer annular portion and an inner annular portion, and a coupling's main body which has a stopper portion at inner circumferential surface and simultaneously screw-coupled between said outer annular portion of the tightening means and the inner annular portion, and holding by pressing a folded back portion of a resin pipe between the stopper portion and an end edge of said inner annular portion; and said tightening means forming a threaded portion at inner circumferential surface of the outer annular portion and at the same time providing a lip seal closely contacting to inner surface of the coupling's main body around this concave portion end, and said coupling's main body forming a threaded portion screw-coupling to the threaded portion of said outer annular portion at the outer circumferential surface and on the other hand, forming a taper portion gradually decreasing a diameter from the opening portion and a straight portion continuing to this at inner circumferential surface and simultaneously forming a groove portion at a portion abutting with folded back apex portion of the resin pipe in said stopper portion, and further a protruded strip band for coupling more firmly with this by abutting to the folded back portion of the resin pipe is provided around ! the circumferential surface of said concave portion in the inner annular portion of nut.

The method for folding back a pipe opening end disclosed in this invention comprises:

(a) a process for fixing an annular body to outer circumference of pipe having a core material at inner hollow in compliance with the requirement, (b) a process for outwardly expanding the pipe opening end and simultaneously pressing to axial direction of the pipe, and (c) a process for folding back a pipe opening end made of material having an elasticity by continuing said pressing, and inserting the folded back pipe opening end to the outer circumference of said annular body.

And, the apparatus used for aforementioned folding back method comprises:

a clamping means of pipe, a bending means, and a driving means of these; and said clamping means including a core material to be inserted into interior of the pipe in compliance with the requirement and a tightening mechanism for pressing the pipe to radial direction, and said bending means for pressing the opening end of the pipe to axial direction of the pipe by the driving means including a main body portion, and a guiding portion for folding back the pipe opening end with outwardly expanding to axial direction accompanying with a pressing action toward the pipe axis direction of the main body portion with contacting to entire circumference of tile pipe opening end. And, in this apparatus, said guiding portion includes a conically protruded portion and a curved surface groove formed around this, and further it is characterized by comprising a position determining means for determining each correlative position of folded portion in the core material and the annular body and the pipe.

Moreover, in this invention, following method for folding back a pipe opening end is also disclosed.

A method for folding back an opening end of resin pipe comprising processes of:

(A) a process for inserting the conically protruded portion of the guiding portion provided with the conically protruded portion and a curved surface groove formed around this and simultaneously advancing with rotating the guiding portion, and (B) a process for folding back the pipe opening end by continuing the advancement and rotation of said guiding portion, and a method for folding back an opening end of resin pipe comprising:

(C) a process for fixing an annular body to a circumference of the pipe, (D) a process for inserting said conically protruded portion of a guiding portion provided with the conically protruded portion and a curved surface groove formed with this and simultaneously advancing with rotating the guiding portion, and (E) a process for folding back the pipe opening end by continuing the advancing with rotating of said guiding portion, and inserting the pipe opening end folded back to a circumference of said annular body.

And, the apparatus used for this folding back method comprises a clamping means for supporting the pipe and a bending means, and said clamping means includes a tightening mechanism for pressing the pipe to radial direction, and said bending means includes a guiding portion for advancing with rotating by abutting to the pipe opening end, a rotational driving mechanism for rotating the guiding portion, and a reciprocating mechanism for advancing and retreating the guiding portion to a pipe axis direction, and it is characterized in that it is made to fold back the pipe opening end to axial direction with outwardly expanding it. And in this apparatus, said guiding portion may be provided with a conically protruded portion and a curved surface groove formed around this.

DETAILED DESCRIPTION OF THE INVENTION

Figure 1:
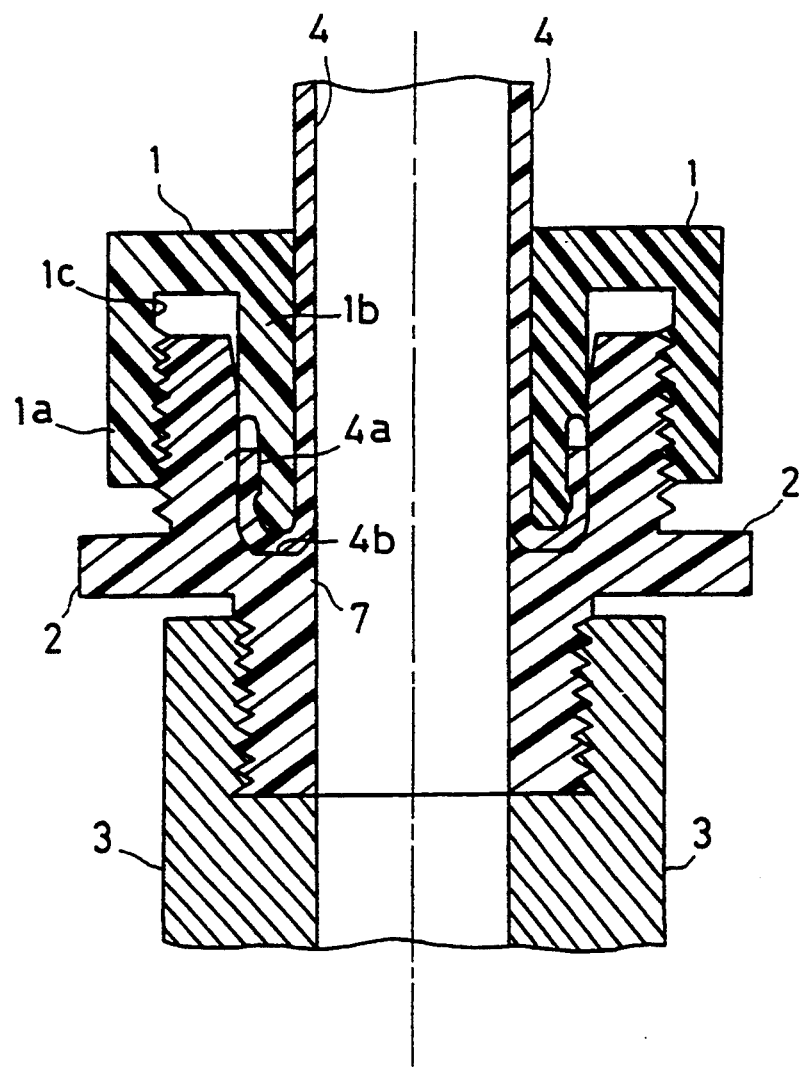
FIG.1 is a cross sectional view showing a first embodiment in accordance with claim 1 and claim 2 of the invention.
Figure 2:
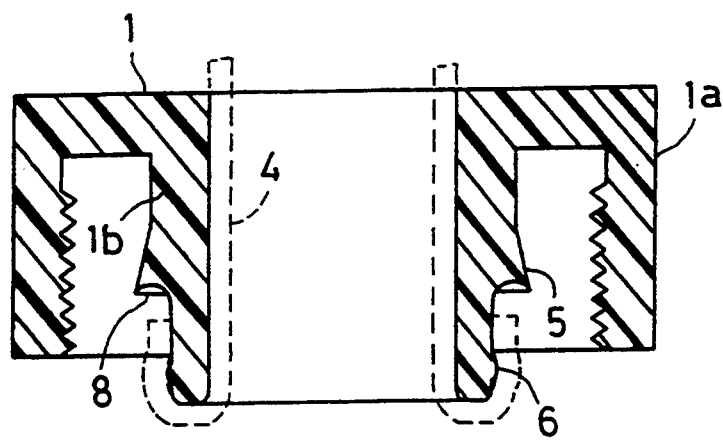
FIG.2 is a magnified view of an end surface of cut portion a tightening means in FIG. 1.
Figure 3:
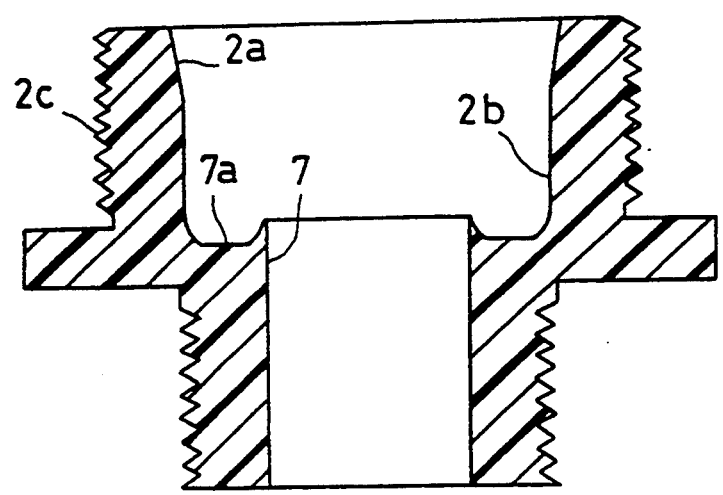
FIG.3 is a magnified view of an end surface of cut a coupling's main body in FIG. 1.

The embodiments of the present invention will be described in more detail with reference to the accompanying drawings. FIG. 1 to FIG.3 are diagrams showing a first embodiment of the invention in accordance with claim 1 to claim 2.

In the drawings, a reference numeral symbol 1 is a cap-like nut or bag-like .nut as a tightening means made of fluoric resin forming a cylindrical shape having an outer annular portion 1a and an inner annular portion 1b, and a threaded portion 1c is formed to an inner circumferential surface of the outer annular portion. A reference numeral symbol 2 is a coupling's main body made of fluoric forming a cylindrical shape coupling in screwing manner to the tightening means, and which has a taper portion 2a gradually decreasing in diameter from the opening portion and a straight portion 2b continuing to this in the inner surface, and formed with a stopper portion 7 at adjacent of terminal end of this straight portion 2b and on the other hand, a threaded portion 2c to be screw-coupled with said threaded portion 1c is formed at the outer surface. A reference numeral symbol 4 is a fluoric resin pipe, and a U-shaped folded back portion 4a is formed at its front end, and an apex portion 4b of the folded back portion 4a is inserted f to a hereinafter described curved surface groove 7a in the coupling's main body 2. Further, a reference numeral symbol 3 is a pump fixed by screw-coupling the coupling's main body 2.

FIG.3 is a magnified view of an end surface of cut portion of the coupling's main body 2, and as shown in the drawings, a curved surface groove 7a is formed at bottom of the stopper portion 7 and which is made to be coupled with said apex portion 4b.

Next, assembling sequence of the coupling in accordance with this embodiment will be described hereinafter. Firstly, the fluoric resin pipe 4 folded back in U-shape with front end is passed to the tightening means 1, and the apex portion 4b of the folded back portion 4a of the pipe 4 is inserted to the curved surface groove 7a in the coupling's main body 2. Successively, a nut 1 is screw-coupled to the coupling's main body 2. The nut 1 descends down in response to the advancement of the screw-coupling, but since a lip seal 5 protruded a little to sideward is formed with a taper portion 2a, and it descends gradually without being caught to the inner surface of the coupling's main body.

On the other hand, as the descending of the tightening means 1, the inner annular portion 1b advances to a gap of the U-shaped folded back portion of the pipe 4, and completely cuts off a leakage of fluid from interior of the pipe 4.

The folded back portion 4a of the pipe 4 is positioned at a concave portion 8 of the inner annular portion 1b, and the folded back portion 4a is firmly contacted to wall surface of the concave portion 8 and the inner surface of the coupling's main body 2. And, said lip seal 5 is also firmly contacted to the inner circumferential surface of the coupling's main body 2, and the leakage to an outside of this coupling becomes completely prevented even if supposing that there would be any leakage between the apex portion 4b and the curved surface groove 7a.

Moreover, the folding back of front end of the fluoric resin pipe 4 is done by using an exclusive using tool, but in case that thickness of the pipe is large, or in case that the folding back is difficult as in multiple layer pipe which is formed with PFA in the inner side and PE in the outer side or a suspended bridge polyethylene in the inner side and a common polyethylene in the outer side, the folding back is readily possible when forming two layers or a plurality layers by making deep cut notches(-not shown ) of circumferential shape to front end surface.

Figure 4:
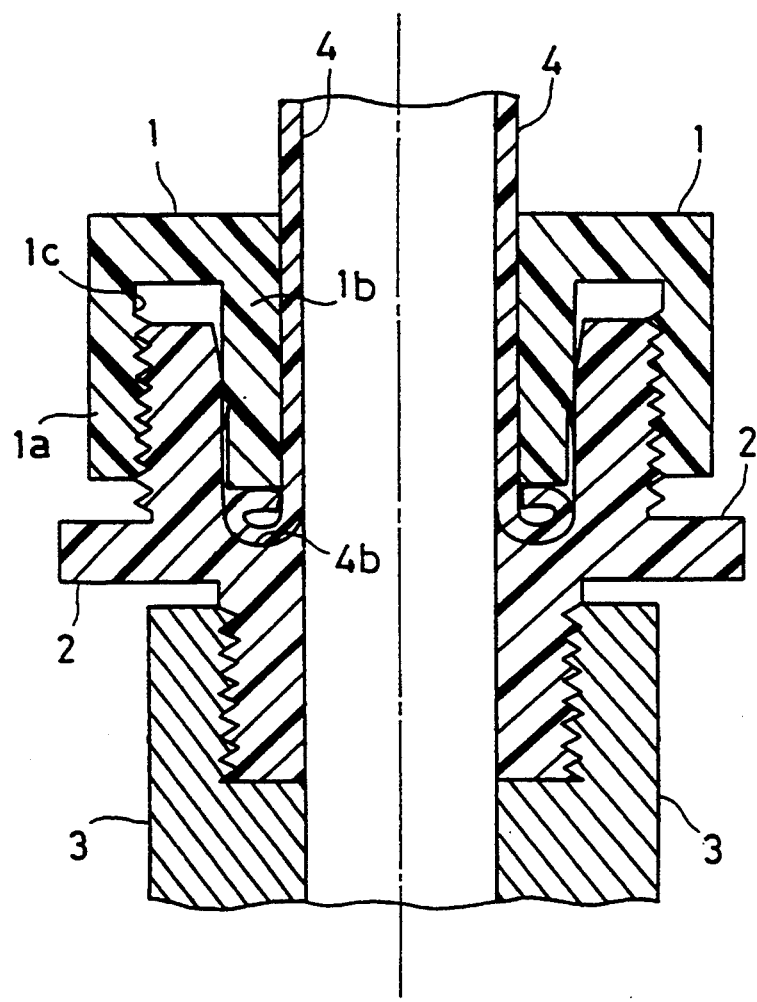
FIG.4 is cross sectional view showing a second embodiment of the invention in accordance with claim 1 to 2.

FIG.4 is a diagram showing a second embodiment of this invention in accordance with claim 1 to 2.

In this embodiment, the front end portion of the pipe 4 is folded back in a state to roll up to outside as shown in the drawing. And, this circularly shaped folded back portion is made to be held by pressing by an end portion of the inner annular portion 1b and the apex portion 4b. The other structures are same as aforementioned embodiment.

The present invention, by the construction and operation as described above, can completely prevent a leakage by a creeping phenomenon which is a great shortcoming included with conventional resin coupling, and further a connection of the fluoric resin pipe which has not been found out in simple and effective joining means heretofore can be very simply executed.

Figure 5:
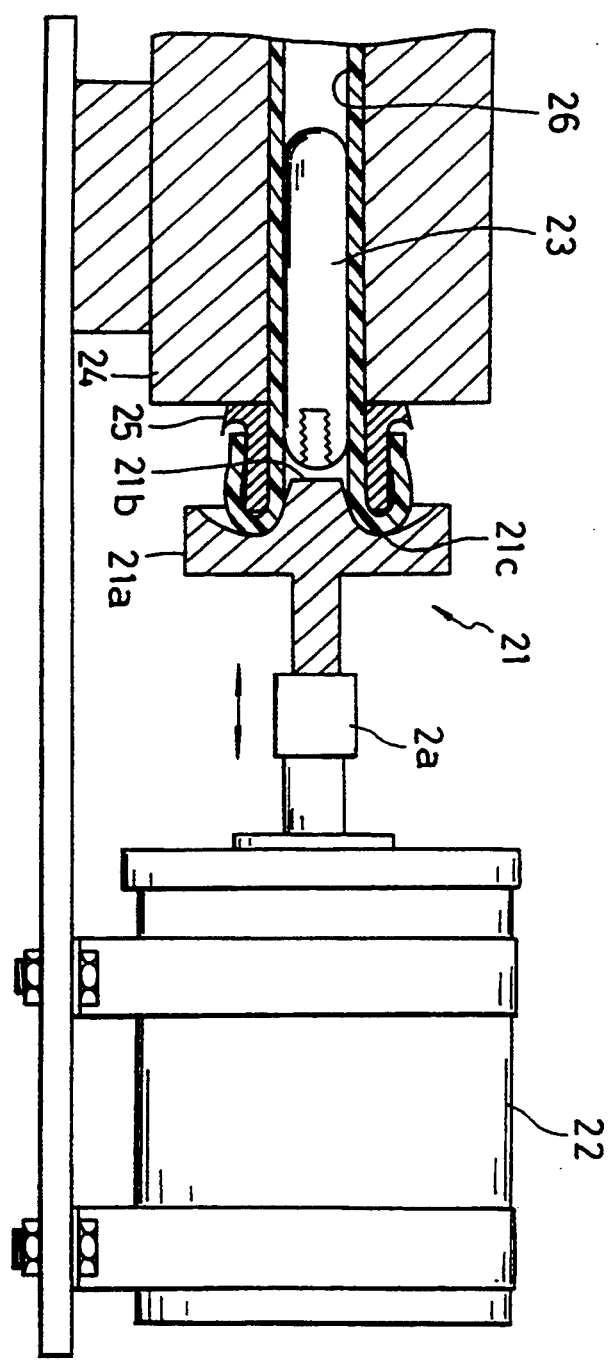
FIG.5 is a side view showing an embodiment in accordance with claim 5.
Figure 8:
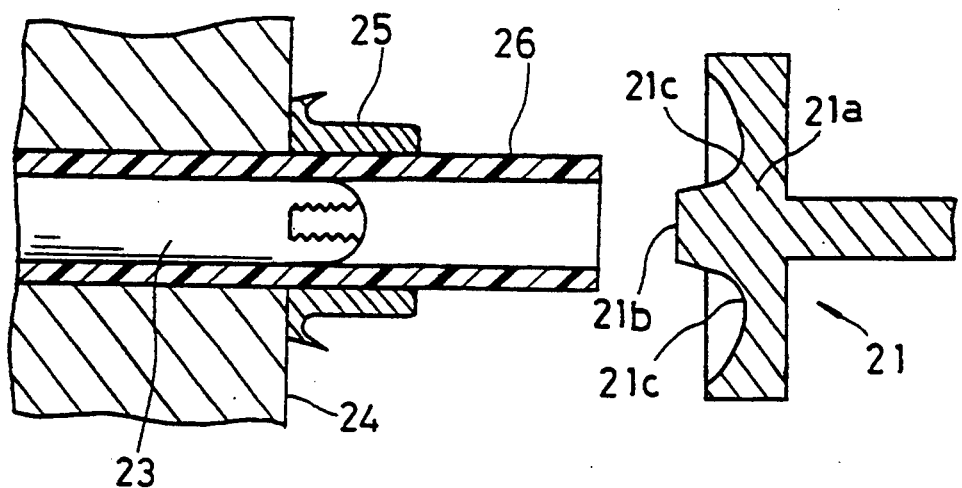
FIG. 8 is a cross sectional view showing an operation of a bending means in claim 5.

FIG.5 is a diagram showing a structure of folding back apparatus !! in accordance with claim 5 and 6. In the drawing, a reference numeral symbol 21 is a bending means, and a reference numeral symbol 22 is a driving source for pressing the bending means 21 to axial direction of the resin pipe 26 through a reciprocating piston rod 22a. The bending means 21 consists of a cylindrically shaped main body 21a and a guiding portion provided at bottom side of this as shown in FIG.8, and this guiding portion consists of a conically protruded portion 21b formed at center of said bottom surface and a curved surface groove 21c around this circumference. A diameter of circular apex portion of the conically protruded portion 21b is made slightly smaller than a diameter of the pipe 26, and a side surface of the cortically protruded portion 21b and the curved surface groove 21c form a continuous surface, and an opening end of the pipe 26 is outwardly expanded as being guided to aforementioned continuous surface as described hereinafter and simultaneously, at a time point that an angle for an axial direction of the pipe of a portion becoming outwardly expanding has become bigger, a phenomenon becomes produced in which it is left from surface of the curved surface groove 21c by an elasticity of pipe 26 forming resin and just as a contraction is started to radial direction and naturally folded back. Further, a connection of main body portion 21a of the bending means 21 and the piston rod 22a is done by a screw-coupling means. Moreover, the resin pipe 26 made of materials of large in elasticity memory such as polytetrafluoroethylene, copolymer with perfluoroalkylvinylether(-PFA), for example, polyethylene(PE), polypropyrene(PE), polybuten(PB), polyamide(PA) and the like, is most suitable for applying this invention.

The driving source 22 is a solenoid, an air cylinder and other well known article. A reference numeral symbol 23 is a core material inserted to a predetermined position within the pipe 26, and a reference numeral symbol 24 is a tightening mechanism for fixing the pipe 26 to a predetermined position, and a clamping means is made by these core material 23 and the tightening mechanism 24.

And, a reference numeral symbol 25 is an annular body to be inserted to circumferential surface of the pipe 26.

Figure 6:
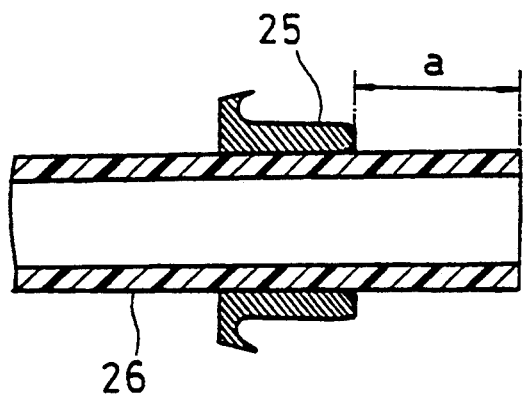
FIG.6 is a cross sectional view showing a relation of position of annular body and the pipe in claim 3.
Figure 7:
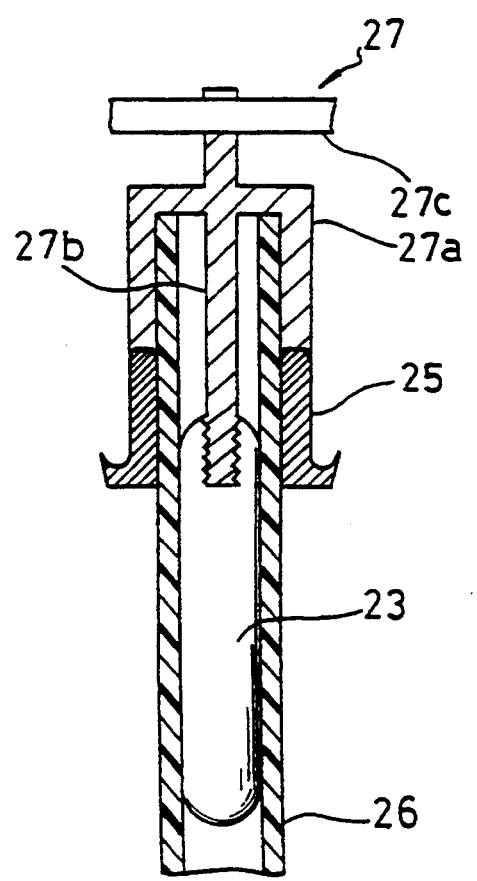
FIG.7 is a cross sectional view showing an action of position determining means(inserting means) in claim 7.

Next, the folding back method of the opening end of the resin pipe 26 together with an operation of the apparatus based on the above-described construction will be described with reference to FIG.6 and 7. As shown in FIG.6, firstly the annular body 15 is inserted to front end of the pipe 26. Since a settlement of this depth El needs a time, an inserting means 27 shown in FIG.7 was used. This inserting means 27 having a function as a position determining means consists of a cylindrical portion 27a having an inner diameter same as an outer diameter of the pipe 26, a connecting portion 27b standing within this cylindrical portion 27a, and a rotating bar 27c. Further, materials such as same material as the pipe, or metal or hard plastic may be used for the annular body 25.

The height of side wall of the cylindrical portion 27a is made to be same as aforementioned depth a, and the connecting portion 27b and the core material 23 are screw-coupled. Accordingly after inserting the annular body 25 to the pipe 26, when the cylindrical portion 27a is pushed up until the front end of the pipe 26 abuts to bottom of the cylindrical portion 27a with rotating the rotating bar 27c by inserting the core material 23 screw-coupled to the connecting portion 27b to the opening portion of the pipe 26, the core material 23 and the annular body 25 are respectively set up to a predetermined position, and simultaneously a folding back amount A becomes to be set at the front end of the pipe 26 as well. After these work, when the rotating bar 27c is reversely rotated, the screw-coupling of the core material 23 with the connecting body 27b is released and the inserting means 27 becomes left away from the pipe 26.

Figure 9:
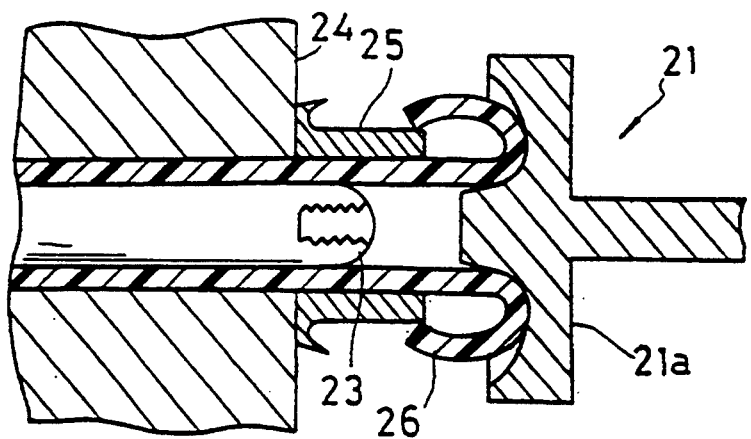
FIG. 9 is a cross sectional view showing an operation of a bending means in claim 5.
Figure 10:
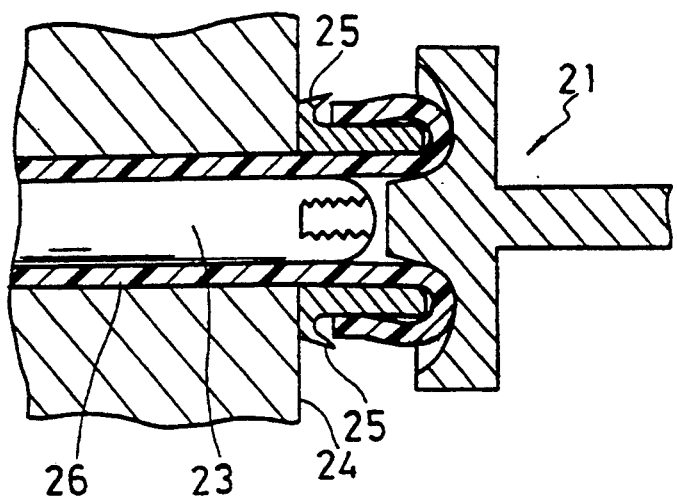
FIG. 10 is a cross sectional view showing an operation of a bending means in claim 5.

FIG.8 to FIG.10 are diagrams showing the folding back process of the front end of the pipe.

As shown in FIG.8, the pipe 26 is firmly held by the tightening mechanism 24. At this moment, since the core material 29 is inserted into the pipe 26, a deformation and the like of the pipe 26 will not be occurred. And, the bending means 21 is abutted to the opening end of the pipe 26 by operating the driving source 22 and at the same time pushed to axial direction. Further, since the use of core material is for preventing its deformation at a moment of holding the pipe 26, it is used in a case of thin in thickness of the pipe and the like, and the core material is not necessarily required in case when the thickness of the pipe is relatively thick, or in case when engraved notches are formed to the holding portion of the pipe whereby a gripping ability is raised.

The conically protruded portion 21b advances also by outwardly expanding the opening end of the pipe 26 along with the advancement of the bending mechanism 21. To this end, the opening end of the pipe 26 moves alongside the side surface of the conically protruded portion 21b. And, the opening end of the pipe 26 reaches the curved surface groove 21c by a further advancement of the main body portion 21a of the bending means 21. Since this curved surface groove 21c is formed with approximately U-shape in cross section, the front end portion of the pipe 26 passes a bottom portion of U-shape by accompanying with the further advancement of the main body 21a, and becomes to be folded back with changing the direction. (refer to FIG.9)

And, when the opening end of the pipe 26 is completely folded back alongside the annular body 25, the advancement of the bending means 21 is stopped, and successively moved back to reverse direction different from the direction up to now. (refer to FIG.10) And, after screw-coupling the core material 23 within the pipe 26 by using the aforementioned inserting means 27, it is pulled out to outside of the pipe 26, and the work is finished. Further, the height of the folded back portion is made to be lower in compliance with the requirement, and it may be used so as not to cover the annular body 25.

Figure 11:
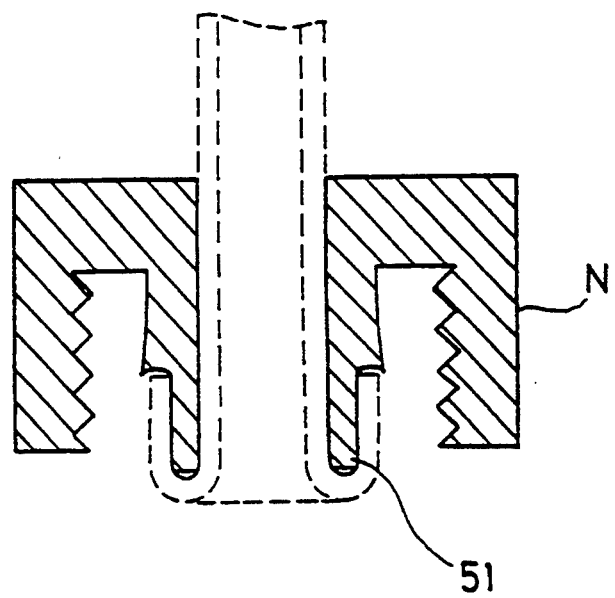
FIG.11 is a cross sectional view showing another embodiment of annular body in claim 5.

FIG.11 is a diagram showing another embodiment of the aforementioned annular body. In this embodiment, the annular body 51 and the nut N are integrally formed.

Figure 12:
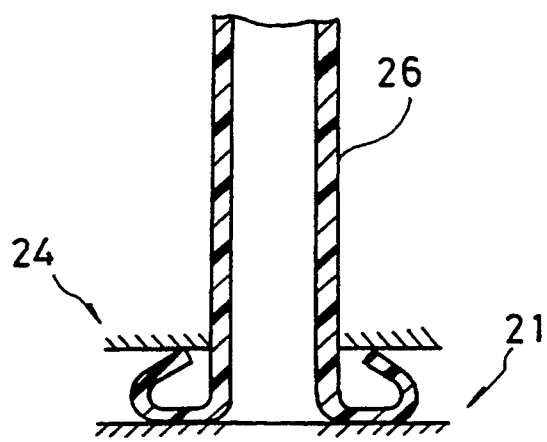
FIG. 12 and FIG.13 are a cross sectional views respectively showing a case folded back the opening end of the pipe without annular body.
Figure 13:
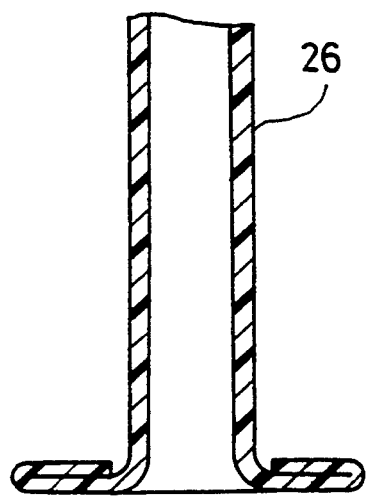

FIG.12 and FIG.13 show a case that the opening end is folded back without fixing the annular body 25 to the pipe, and a flange portion is formed to the pipe end.

Figure 14:
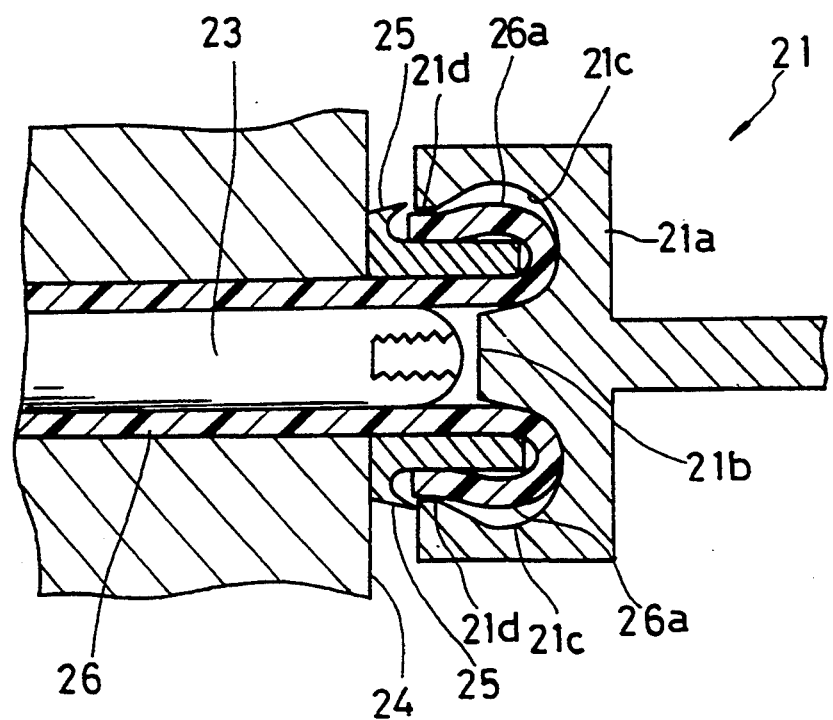
FIG.14 is a cross sectional view showing another embodiment of the bending means.

FIG.14 is a diagram showing a case of forming a flange portion to the pipe end. In this embodiment, the bending means 21 includes an annular convex strip portion 21d other than the main body portion 21a, the conically protruded portion 21b, and the curved surface groove 21c. An inner diameter of this convex strip portion 21d is made to be slightly bigger than an outer diameter of the folded back portion of the pipe 26 closely contacted to the curved surface groove 21c. To this end, when a folding work of the pipe 26 is finished and the bending means 21 is retreated, a small expanded portion produced at the folded back portion of the pipe 28 receives a pressure of the convex strip portion 21d and then compensated, and the folded back portion is closely contacted to an outer circumferential surface of the annular body 25 in a smooth state.

The embodiment of the invention in accordance with the above-described claim 3 to 7 can exactly and rapidly manufacture a resin pipe folded back the front opening end to outer circumferential surface side.

Moreover, in case of connecting the conventional pipe by a coupling and the like a troublesome process to cut so as to make the end surface of the pipe to be a right angle in axial direction was required, but in accordance with the technique by this application, since an end surface of the opening portion of the folded back pipe forms a exact right angle against the axial direction, a conventional troublesome process as aforementioned is not necessary.

Figure 15:
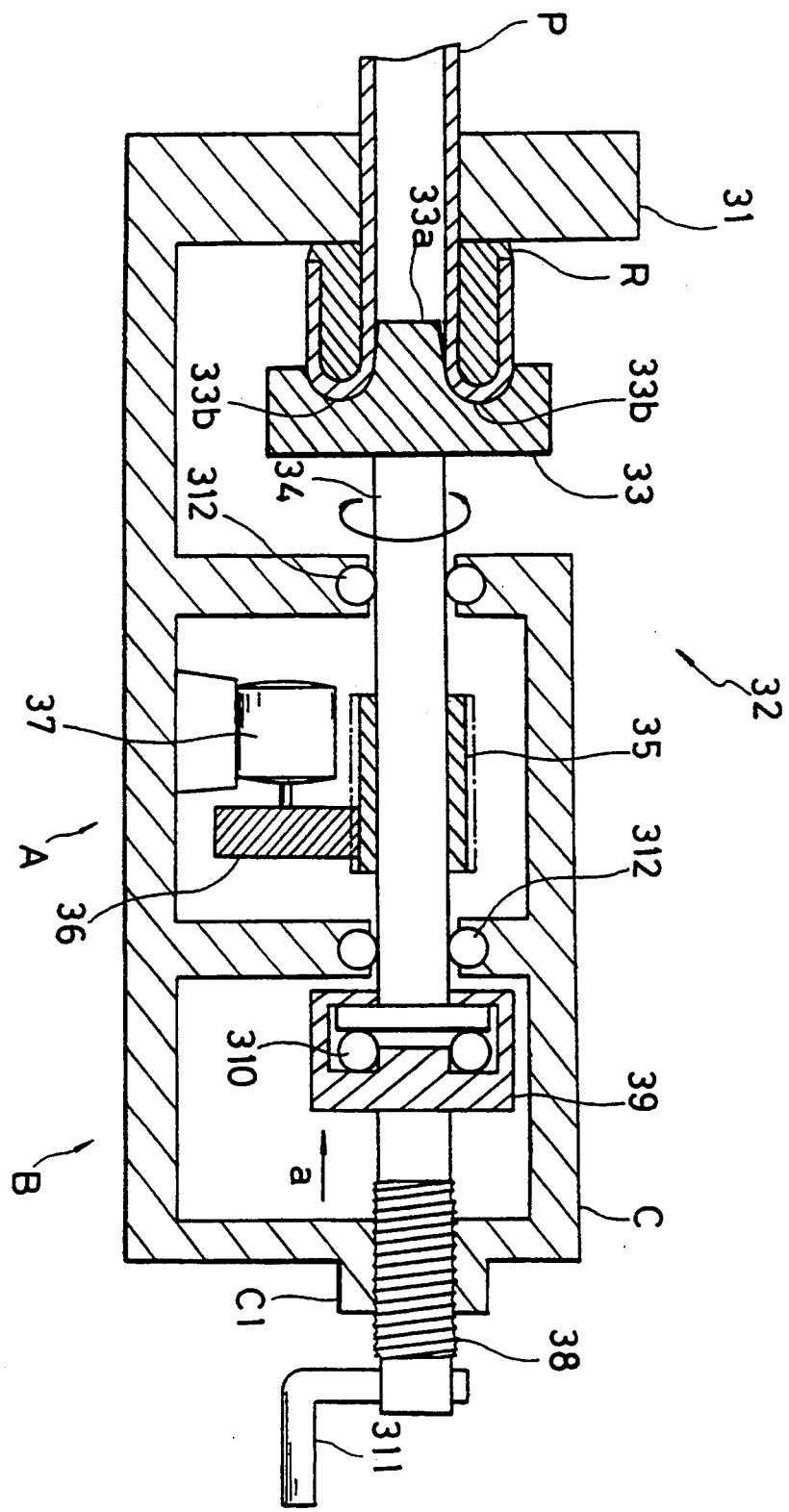
FIG. 15 is a side cross sectional view showing a first embodiment of claim 10.

FIG.15 is a diagram showing a structure of the folding back apparatus in accordance with an embodiment of this claim 10. In accordance with this drawing, it will be described by going abreast of the embodiments of the folding back method of claim 9 and the folding back apparatus of claim 10.

In the drawings, a reference numeral symbol 31 is a tightening mechanism for holding by pressing the resin pipe P in radial direction, and a reference numeral symbol 32 is a bending means, and which are made of a guiding portion 33 for rotating by contacting to the opening end of the resin pipe P, a rotational driving mechanism A for rotating this guiding portion 33, a reciprocating mechanism B for advancing and retreating the aforementioned guiding portion 33 to axial direction of the pipe P, and an enclosure body C including these.

And, said guiding portion 33 includes a conically protruded portion 33b to be inserted to an opening portion of the pipe P and a curved surface groove 33a which is formed around this and its cross section is approximately U-shape.

And, the rotational driving mechanism A comprises a rotary shaft 34 rotatably supported to the enclosure body C, a wide teeth gear 35 fixed to this rotary shaft 4, a thin teeth gear 36 fixed to a motor so as to be meshed to this wide teeth gear 35, and a motor 37 for rotating this gear 36 freely to right and left.

In addition, the reciprocating mechanism B comprises an advancing/retreating shaft 38 in which a housing 39 rotatably coupling a flange portion formed at rear end of said rotary shaft 3 is fixed at one end and having a rotating handle 311 at another end, and a bearing portion 310 fixed between said flange portion and bottom surface of the housing 39 within the housing 39.

A threaded portion is formed at an outer circumference of the advancing/retreating shaft 38 and it is screw-coupled to a bearing C1 of the enclosure body C, and the advancing/retreating shaft 38 is made to be advanced and retreated in axial direction in response to the rotation of the handle 311. Further, a reference numeral symbol 313 is a bearing portion provided to the bearing of said rotary shaft 34 and the enclosure body C. In accordance with the aforementioned construction, an operation of this embodiment will be described.

Firstly, a ring R is inserted to the outer circumference of the resin pipe P, and it is fixed to a predetermined position by the tightening mechanism 31. The conically protruded portion 33a of the guiding portion 33 is inserted to the opening portion of the pipe P and at the same time, the opening end of the pipe P is contacted to the curved surface groove 33b. In this state, the rotary shaft is rotated by the motor M and the guiding portion 33 is rotated to either direction of right or left.

At this moment, the rotation of the rotary shaft 34 is transferred to the guiding portion 33, but it is not transferred to said advancing/retreating shaft 38.

At a time point that the guiding portion 33 is abutted to the opening end of the pipe P and started a sliding, the rotary shaft 38 is advanced in a direction of arrow t by rotating the advancing/retreating shaft. 38 to a predetermined direction by the handle 311. By the advancement of the advancing/retreating shaft 38 toward arrow a, the housing of the end portion of the advancing/retreating shaft 38 pushes the rotary shaft 34 to arrow direction through the bearing portion 310.

When the rotary shaft 34 is pushed, the wide teeth gear 35 moves to arrow A direction by removing the meshing portion of the gear 36 in axial direction.

Thus, when pushing it to pipe P by rotating the guiding portion 33, despite it is a very little pressing power, the opening end of the pipe P is guided to the curved surface groove 33b of the guiding portion 33 and led to outside and eventually the advancing/retreating shaft 38 is moved to opposite direction of arrow , and the rotary shaft 34 coupling to the housing at its one end is also moved by following the retreat of the advancing-/retreating shaft 38, and the cylindrical gear 35 and the gear 36 are meshed and it is returned to original position.

By the way, in this method, a matter in which the pushing pressure to direction of pipe P of the guiding portion 33 is all right even if it is very small, is as like as aforementioned, but a result tested by comparing this to the technique disclosed in claim 3 to claim 7 is as follows.

That is, in case where an opening end of PFA pipe of 12.5 mm in outer diameter, 9.5 mm in inner diameter, and 1.5 mm in thickness is folded back and formed to 7 mm in length of the folded back portion and 4 mm in thickness of the folded back apex portion, the pushing pressure required for the advancement of the guiding portion was approximately 230 Kg.

In contrast with this, in this embodiment, a folding back of same condition with aforementioned was made by a pushing pressure of approximately 50 Kg in presumption.

Figure 16:
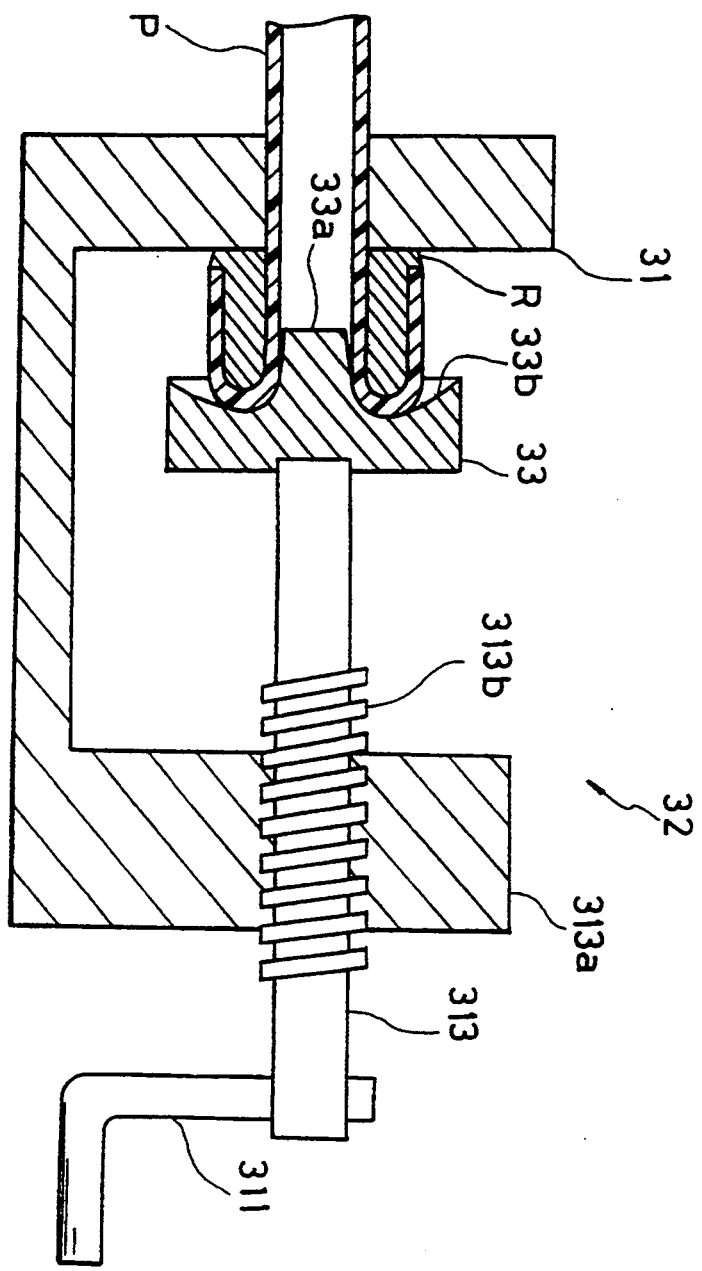
FIG.16 is a side cross sectional view showing a second embodiment of claim 10, FIG.17 and FIG.(A),(B) are diagrams showing examples of folding back process of the pipe opening end in accordance with claim 8 or claim 9.

FIG. 16 is a diagram showing an embodiment of the folding back apparatus in accordance with claim 11. In an apparatus related to this embodiment, different from aforementioned embodiment, the rotational driving mechanism rotating the guiding portion and the reciprocating mechanism for advancing and retreating the guiding portion are integrally structured. That is, in the drawings, a reference numeral symbol 31 is a tightening mechanism for holding by pushing the resin pipe P in radial direction, a reference numeral symbol 32 is a bending means, and which consists of a guiding portion 33 for contacting to the opening end of the resin pipe P and rotating thereof, a rotational driving mechanism for rotating this guiding portion 33, and a reciprocating mechanism for advancing/retreating said guiding portion 33 to axial direction of the pipe, and these rotational driving mechanism and the reciprocating mechanism comprise a rotary pressing shaft 313 and a bearing 313a for bearing this by screw-coupling to the thread of this rotary pressing shaft 313, and a handle 311 fixed to terminal end portion of the rotary pressing shaft 313, and the rotary pressing shaft 313 advances to or retreats from the pipe P by doing a helical movement by the rotation of the handle 311, and accordingly the guiding portion 33 fixed to front end of this rotary pressing shaft 313 becomes also advances to or retreats from the opening end of the pipe P with rotating.

Further, the guiding portion 33 as in aforesaid embodiment includes a conically protruded portion to be inserted to the opening end of the pipe P and a curved surface groove 33b of approximately U-shape in cross section and formed around this.

Operation of this embodiment will be described in accordance with the aforementioned structure.

Firstly, a ring R is inserted to the outer circumference of the resin pipe P, and fixed to a predetermined position by a tightening mechanism 31, and the rotary pressing shaft 313 is advanced to a direction of the pipe P by rotating the handle 311 whereby the conically protruded portion 33a of the guiding portion 33 is inserted to the opening portion of the pipe P and at the same time, the opening end of the pipe P is contacted to the curved surface groove 33b.

At a time point that the guiding portion 33 has started a sliding movement by abutting to the opening end of the pipe P, when the handle 311 is further rotated, the rotary pressing shaft 313 advances to the direction of the pipe P by doing a helical movement, and accompanying with this, the guiding portion 33 is also rotated and presses this with contacting by sliding to the opening end of the pipe P.

Thus, when the guiding portion 33 is rotated and gradually pressed to the pipe P, despite it is a very small pressing power, the opening end of the pipe F is guided to the curved surface groove 33 of the guiding portion 33 and led to outside and eventually folded as shown in drawing whereby becomes to a state being inserted to the outer circumference of said ring R.

At a time point that the folding back of the pipe is finished, when the handle 311 is reversely rotated, the rotary pressing shaft 313 moves to opposite direction different from the direction up to now, and the guiding portion 33 is left away from the pipe F.

In this embodiment also, a matter that a suitable folding back is done despite the pressing power against the opening end of the pipe of the guiding portion is very small, is clear by following test as well.

That is., this test is done in a state that the folding back work of the pipe providing an opening roll portion to a terminal end of the pipe of 17 mm in outer diameter, 13 mm in inner diameter, and 2 mm in thickness of polybuten made is not mounted with annular ring at its circumference, and its result is compared with technique of claim 3 to 7 and technique in accordance with this embodiment. In the drawing, a reference numeral symbol 31 is a tightening mechanism, a numeral is a guiding portion, a numeral 33a is a conically protruded portion numeral 33b is a curved surface groove, and P is a pipe.

In contrast with this in case of technique related to claim 3 to 7, the guiding portion 33 is not rotated and the opening end of the pipe P is pressed but in case where the martial of the pipe is a little hard material such as polybuten and the like, the opening end edge of the pipe P is outwardly expanded with sliding within the curved surface groove alongside the curved surface groove 33b by the pushing pressure of the guiding portion 33, but the end edge of the pipe becomes a so-called head pressed state at a time point that the front end of the pipe is advanced to a bending point of the guiding portion shown in drawing, and big resistance is produced, and there may be a case that energy of thrust makes deformation because of opening at a place smaller in resistance than the thrust of the guiding portion side.

In contrast with this, in the invention related to claim 8 to 11, the resistance becomes very small by a slant surface effect and a moving friction, and thereby the front end of the pipe is folded back by a weak thrust. And, the tightening force of the clamping resistive to this weak thrust is all right even it is small, and the apparatus is simplified.

Figure 17:
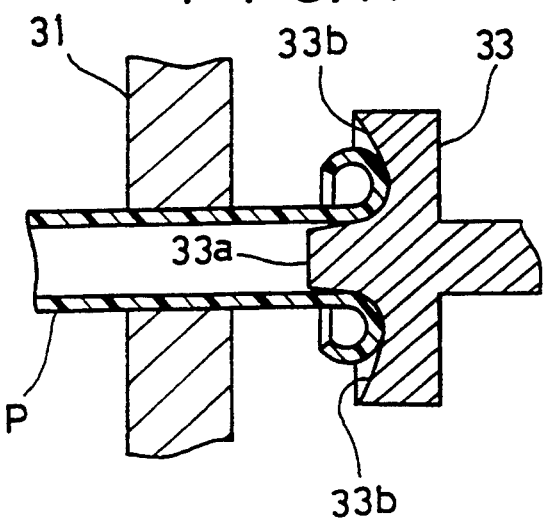

Thus, in a ease of this embodiment, since the guiding portion 33 applies a very weak pushing pressure in a direction of the pipe with rotating, a deformation is not produced as shown in FIG.17, and the opening end of the pipe is folded back and a shape called by so-called opening roll is formed.

Thus, in this embodiment, since the guiding portion is abutted to the opening end of the pipe with rotating, the opening end can be expanded and folded back by a small pushing pressure to axial direction, and this is thought that it is caused from a principle of screw or slant effect. That is, a case of pushing to opening end of the pipe without giving a rotation to the guiding portion corresponds to a case of inserting a wedge by striking perpendicularly, while the case of this invention which gradually inserts tho guiding portion to the opening end of the pipe with rotating is thought that it corresponds to a case of inserting a screw which dose not strike in a wedge.

Accordingly, in above-described embodiment of the invention, a ease of rotating the guiding portion is described, but same effect can be obtained when the guiding portion is fixed and the pipe side is rotated.

Figure 18A:
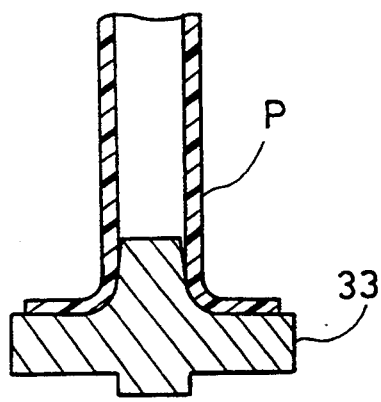
Figure 18B:
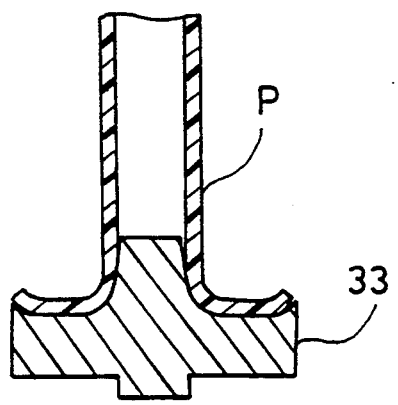

Further, in the above-described embodiment since the advancement to the opening end of the pipe of the guiding portion is done by a screw, an advancing amount of the guiding portion can be finely adjusted and therefore, the folding back process of the opening end of the pipe can be freely done as shown in FIG.18. That is, FIG.18(a) shows a case that the opening end of the pipe is made to a flange shape without fully folding back, and FIG.18(b) shows a case that the folding back amount is stopped to a little extent.

Thus, in accordance with the invention related to claim to 11, since the of opening end of the pipe can be smoothly and easily folded back and besides the pushing pressure for folding back can be finely adjusted, various folded back shapes can be obtained.

What is claimed is:

1. A coupling comprising a nut-shaped tightening means having an outer annular portion and an inner annular portion, the inner surface of said outer annular portion being threaded and the outer surface of said inner annular portion having a recess therein; said tightening means adapted to receive a first conduit through the inner annular portion thereof, said conduit having a terminal portion thereof folded back upon itself and seated in said recess;

an annular main body coupling having a first threaded portion and a second threaded portion in the exterior walls thereof, an inner surface of the first threaded portion of said main body coupling being tapered from a first diameter to a second and smaller diameter, said second diameter being maintained through the remainder of the first threaded portion and terminating in a curved ledge adapted to receive the curved bottom of the folded back portion of the conduit and sealing said conduit to said tightening means and main body coupling upon threaded engagement therebetween; and a second conduit adapted to be threadedly engaged to the second threaded portion threads of said main body coupling, thereby couplings said first conduit to said second conduit.

2. A coupling as defined in claim 1 wherein the inner annular portion of the tightening means terminates in a protruding projection for more firmly seating the folded back portion of the first conduit between the tightening means and the main body coupling.

* * * * *